United States Patent [19]

Kemp et al.

[11] 4,110,650

[45] Aug. 29, 1978

[54] BRUSHHOLDER SUPPORTING STRUCTURE

[75] Inventors: Grey Charles Kemp; Eion Murray Spence, both of Peterborough, Canada

[73] Assignee: Canadian General Electric Company Limited, Toronto, Canada

[21] Appl. No.: 661,303

[22] Filed: Feb. 25, 1976

[30] Foreign Application Priority Data

May 14, 1975 [CA] Canada .................................. 226877

[51] Int. Cl.[2] ............................................ H02K 13/00

[52] U.S. Cl. ...................................... 310/239; 310/42; 403/265; 403/359

[58] Field of Search ............... 310/239, 238, 219, 232, 310/273, 242, 245, 246, 247, 42, 228, 66; 403/265, 267, 359

[56] References Cited

U.S. PATENT DOCUMENTS

| | | | |
|---|---|---|---|
| 1,727,917 | 9/1929 | Zerbo | 310/239 |
| 2,709,764 | 5/1955 | Legg | 310/239 |
| 2,897,386 | 7/1959 | Jones | 310/239 |
| 3,271,605 | 9/1966 | Drabik | 310/239 |
| 3,471,732 | 10/1969 | Drabik | 310/245 |
| 3,553,504 | 1/1971 | Balcke | 310/239 |

*Primary Examiner*—R. Skudy

*Attorney, Agent, or Firm*—Albert S. Richardson, Jr.

[57] ABSTRACT

A brushholder is adapted to be secured to the frame of a dynamoelectric machine by means of either insulated steel studs or resin-bonded fiber glass studs. The frame of the brushholder contains at least two holes which are spaced apart and in parallel. Each hole is adapted to receive one end of the steel stud as an interference fit or one end of the fiber glass stud as a clearance fit. An adhesive is used to bond the fiber glass stud in the hole. The wall surface defining the hole contains groove means which helps key the adhesive to the surface but does not detract significantly from the interference fit of the steel stud.

6 Claims, 2 Drawing Figures

BRUSHHOLDER SUPPORTING STRUCTURE

Figure 2:
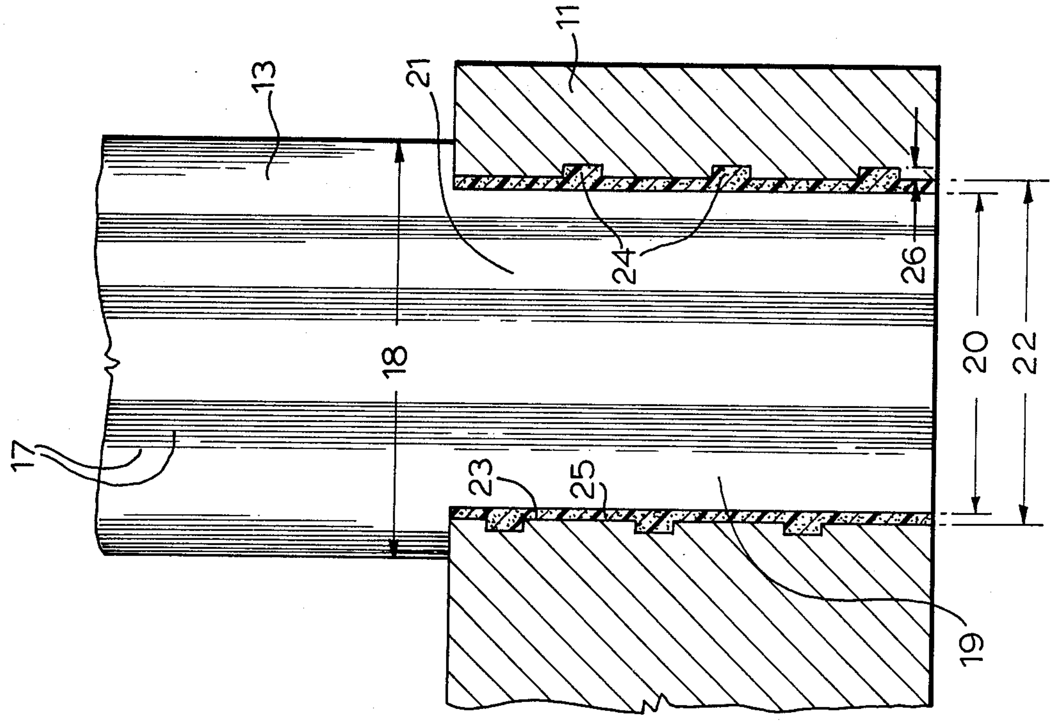

This invention relates generally to brushholders for dynamoelectric machines, and more specifically to structure used for supporting a brushholder on the frame of a machine and insulating the brushholder from the frame.

In dynamoelectric machines such as large DC motors, e.g., DC motors for railway locomotives, it is known to support each brushholder from the frame of the machine by means of two steel studs standing in the same direction on the frame of the brushholder in spaced parallel relation and clamped at their extremities to support means on the frame of the machine. Each stud is circular and is attached to the frame of the brushholder through an interference fit of one end of the stud in a circular hole in the brushholder frame, i.e., a fit wherein the brushholder frame was first heated to enlarge the hole, the end of the cold stud then inserted into the hole, and finally the frame cooled to shrink it onto the stud. The other ends of the two studs are clamped between a pair of clamping members, one of which is firmly secured to the frame of the machine. In order to insulate the brushholder from the frame of the machine, those surfaces on each stud in the region of the clamping structure are covered with electrical insulation. Usually, this insulation covers the entire exposed stud surface. Stud insulation may consist of a preformed sleeve placed around the stud, a plastic material moulded onto the stud, or, most recently a fluidized bed coating of an insulating material such as expoxy.

All of the materials heretofore used for insulating steel studs have one serious draw back; in too many cases the insulation fails electrically before it should. Many failures occur during high voltage tests (high pot) before or after assembly of the studs on the brushholder, or after assembly of the brushholder in the machine. Others occur prematurely during machine operation. Moreover, the insulation is exposed to mechanical injuries from mechanics' tools, and such injuries frequently lead to electrical failures. Failure of stud insulation is a serious nuisance that can also be costly in replacement parts, repair time, and in the time that the machine is out of service.

According to this invention the studs are made of insulating materials such as resin bonded glass fibers, and the brushholder frame is adapted for interchangeability of one or both of the new studs with the aforementioned steel studs. That end portion of the new stud to be inserted into the hole in the brushholder frame is made a clearance fit in the hole, i.e., a few mils less in diameter than the hole, and is bonded to the wall surface defining the hole by means of a strong adhesive; whereas, the corresponding end portion of the steel stud remains unchanged as an interference fit in the hole and is secured therein as discussed in the prior art, that is, by first enlarging the hole through expansion of the metal around the hole with heat so the end of the stud can be pushed into place, and then allowing the metal to cool and contract onto the stud. In order to increase the strength of the adhesive bond between the new stud and the frame, groove means is provided in the wall surface of each hole, which groove means may take the form of a helix resembling a course pitch thread, e.g., an Acme thread or a number of circular grooves spaced well apart. This groove means is made to take away a minimum of wall surface, just enough surface area to give the bonding medium a good grip on the wall and yet not great enough to detract significantly from the interference fit of the steel stud. This grip of the bonding medium is further strengthened by making the groove means shallow, just deep enough for maximum strength of the bonding medium. A measure of the strength of the bond or interference fit is the force required to push the stud out of the hole in the brushholder frame. That end portion of each stud retained in the clamping structure that mounts a brushholder on a machine remains uncharged, i.e., the diameter of this portion for a resin-fiber glass stud is the same as the overall diameter of the insulated steel stud. The lengths of the two types of studs are substantially the same.

In summary, this invention provides a stud - brushnolder combination wherein the new resin-fiber glass studs are interchangeable with the prior art steel studs. Hence, either type of stud can be stocked by a user of the machine, and in the event of a stud failure a repair is readily made using either type of stud. A supply of the bonding material, will of course, be made available for use with the new studs. A significant advantage of the new stud resides in its composition; it is composed entirely of insulating materials that produce a stud of substantially the same mechanical strength as the steel stud. As a result, the new stud is far less prone to electrical breakdown and no more prone to mechanical failure.

Figure 1:
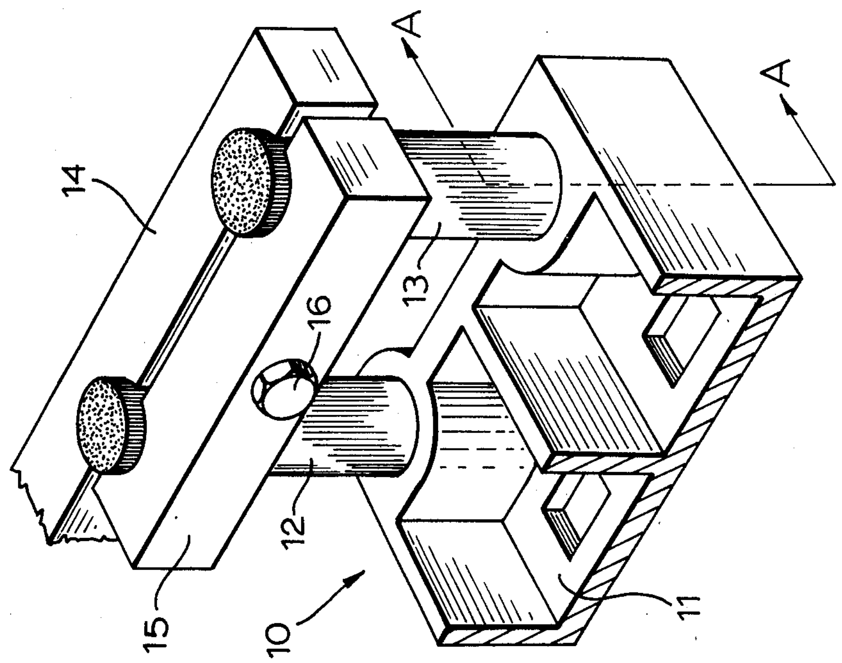

An embodiment of the invention will now be described in detail with reference to the accompanying drawings, in which FIG. 1 is a perspective view of a portion of a brushholder frame, the studs, and means for supporting the studs from the frame of the machine; and FIG. 2 is a section taken along A—A of FIG. 1 showing the mounting of a stud in the brushholder frame.

FIG. 1 shows an assembly 10 consisting of a portion 11 of a brushholder frame and a pair of cylindrical studs 12 and 13 having one end thereof secured to portion 11 such that the remainder of the studs project from the frame portion in the same direction in spaced parallel relation. The assembly is supported on the frame of a dynamoelectric machine by means of a pair of clamping members 14 and 15 between which the other ends of the studs are clamped. Member 14 is mounted on the frame of the machine and member 15 is secured to it by way of the studs and a capscrew 16 threaded into member 14. As clearly illustrated in FIG. 1, members 14 and 15 contain semi circular cut outs in which the stud ends are held by the clamping forces that capscrew 16 applied to the members.

Reference should now be made to FIG. 2 where a portion of stud 13 and its mounting in frame 11 are shown in detail. Stud 13 is a length of material cut from a circular rod comprising a cylindrical bundle of glass fibers 17 disposed longitudinally in the rod and bonded together by means of a polymeric compound such as an epoxy or polyester resin, the former being preferred. The rod is made to a diameter 18 which is the same as the overall diameter of the insulated steel stud. The outside diameter of one end 19 of the stud is reduced to the dimension 20, which dimension is slightly (e.g., a few mils) less than the diameter 22 of the hole 21 in frame 11. The stud is therefore a clearance fit in the hole; it is secured therein by a resinous bonding medium better known as an adhesive. A rod found suitable for the studs is one purchased from Spaulding Fibre of Canada under the tradename "Glastie HIR".

Hole 21 is shown as a round hole with a predetermined diameter 22, namely the diameter required for securely capturing a conventional steel stud as an interference fit in the hole. The brushholder frame preferably is made of the same material that persons skilled in the art have heretofore been using for brushholder frames, and when it is heated the diameter of the hole 21 will expand so as to permit installation, if desired, of the cold end of an insulated steel stud (not shown). The wall surface 23 defining hole 21 of diameter 22 is provided with groove means 24 for purposes of increasing the bond of the adhesive used to secure the stud 13 in the hole. This bonding medium or adhesive is shown at 25 filling the entire space between the end 19 of the stud and the wall of the hole, including the space between the stud and surface 23 and groove means 24. There are a number of resinous epoxy adhesives known for their great strength and tenacious adherence qualitities that are well suited for use at 25. Groove means 24 may take the form of a helix resembling a course pitch thread, e.g., an Acme thread, or a number of circular grooves spaced well apart along wall 23. In FIG. 2, it is shown in rectangular thread form that is very shallow as indicated at 26. The surface area 23 taken away by groove means 24 is a relatively small part of the total area; it is enough to give the adhesive a good grip on the wall and yet not enough to detract significantly from the interference fit of the steel stud. It is deep enough to key the adhesive to the wall and no more. Stud 12 is exactly the same as stud 13 and is secured to frame 11 in exactly the same way.

In assembling studs 12 and 13 to frame 11, the surfaces of the studs and holes are well cleaned with a solvent such as acetone and then thoroughly dried. The adhesive is then applied to the surfaces of both the stud and the hole, the stud inserted into the hole, the adhesive cured at room temperature for a period of time and finally cured at an elevated temperature for another period of time.

Tests made on assemblies 10 have given results equal or better than those obtained on prior art assemblies. Since the studs are composed entirely of insulating materials, electrical tests produce few failures indeed. The mechanical strength of the fiber glass studs is equivalent to that of the steel studs, and the force required to push them out of the holes in the brushholder frame is at least equal and in some cases greater than the force required to push out the steel studs.

The embodiments of the invention in which an exclusive property or privilege is claimed are defined as follows:

1. A brushholder adapted to be secured to the frame of a dynamoelectric machine and insulated therefrom by means of cylindrical studs said brushholder having a frame containing at least two round holes spaced apart in parallel relation, each of said holes being defined by a wall surface of said frame having a predetermined diameter that is smaller than the outside diameter of one end of an insulated steel stud so that said wall surface is adapted to capture such a steel stud in an interference fit, groove means comprising a course pitch helical groove of shallow rectangular form in the wall surface defining each of said holes, a generally cylindrical resin bonded fiber glass stud one end of which has an outside diameter slightly less than said predetermined diameter, said one end of the fiber glass stud being disposed in a first one of said holes, and an adhesive for bonding said fiber glass stud to the remaining wall surface and to the groove means of said first one of said holes, said groove means being of a size that takes away just enough area of the wall surface defining each of said holes to provide a good adhesive bond between a fiber glass stud and the brushholder frame without detracting significantly from the interference fit of an insulated steel stud that can alternatively be installed in any of said holes.

2. The brushholder of claim 1 wherein said resin-bonded fiber glass stud consists of a bundle or axially disposed glass fibers bonded together by means of a resinous material selected from a class including epoxy and polyester resin.

3. The brushholder of claim 1 wherein said adhesive is an epoxy resin bonding medium.

4. The brushholder of claim 1 wherein the dimension of the outside diameter of the end of said fiber glass stud opposite said one end is greater than said predetermined diameter of said holes.

5. The brushholder of claim 1 wherein there are at least two fiber glass studs disposed in clearance fits and bonded by adhesive in the respective holes of said brushholder frame.

6. A brushholder adapted to be secured to the frame of a dynamoelectric machine and insulated therefrom by means of cylindrical studs said brushholder having a frame containing at least two round holes spaced apart in parallel relation, each of said holes being defined by a wall surface of said frame having a predetermined diameter that is smaller than the outside diameter of one end of an insulated steel stud so that said wall surface is adapted to capture such a steel stud in an interference fit, groove means consisting of a number of annular grooves in the wall surface defining each of said holes, said annular grooves being spaced well apart and being of shallow rectangular form, a generally cylindrical resin bonded fiber glass stud one end of which has an outside diameter slightly less than said predetermined diameter, said one end of the fiber glass stud being disposed in a first one of said holes, and an adhesive for bonding said fiber glass stud to the remaining wall surface and to the groove means of said first one of said holes, said groove means being of a size that takes away just enough area of the wall surface defining each of said holes to provide a good adhesive bond between a fiber glass stud and the brushholder frame without detracting significantly from the interference fit of an insulated steel stud that can alternatively be installed in any of said holes.

* * * * *